US009781145B2

United States Patent
Bronshtein et al.

(10) Patent No.: US 9,781,145 B2
(45) Date of Patent: Oct. 3, 2017

(54) PERSISTENT CROSS-SITE SCRIPTING VULNERABILITY DETECTION

(71) Applicant: International Business Machines Corporation, Armonk, NY (US)

(72) Inventors: Emanuel Bronshtein, Ashdod (IL); Roee Hay, Haifa (IL); Sagi Kedmi, Raanana (IL)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 14/552,570

(22) Filed: Nov. 25, 2014

(65) Prior Publication Data

US 2016/0149946 A1    May 26, 2016

(51) Int. Cl.
G06F 11/00    (2006.01)
H04L 29/06    (2006.01)

(52) U.S. Cl.
CPC ...... H04L 63/1433 (2013.01); H04L 63/1466 (2013.01)

(58) Field of Classification Search
CPC .................. H04L 63/1433; H04L 63/1466
See application file for complete search history.

(56) References Cited

U.S. PATENT DOCUMENTS

| 8,578,482 | B1* | 11/2013 | Yang | G06F 21/51 726/22 |
| 8,752,183 | B1* | 6/2014 | Heiderich | G06F 21/577 726/22 |
| 8,856,869 | B1* | 10/2014 | Brinskelle | H04L 63/08 726/12 |
| 8,949,990 | B1* | 2/2015 | Hsieh | G06F 21/577 726/22 |
| 9,032,519 | B1* | 5/2015 | Maher | H04L 63/08 709/223 |
| 9,049,222 | B1* | 6/2015 | He | H04L 63/1416 |

(Continued)

FOREIGN PATENT DOCUMENTS

WO    2014018029 A1    1/2014

OTHER PUBLICATIONS

U.S. Appl. No. 14/730,261 entitled "Persistent Cross-Site Scripting Vulnerability Detection", filed Jun. 4, 2015.

(Continued)

*Primary Examiner* — Techane Gergiso
(74) *Attorney, Agent, or Firm* — Michael T. Fulton

(57) ABSTRACT

A system and program product are described herein for various techniques for detecting a persistent cross-site scripting vulnerability are described herein. In one example, the techniques include detecting, via the processor, a read operation executed on a resource using an instrumentation mechanism and returning, via the processor, a malicious script in response to the read operation. The techniques also include detecting, via the processor, a write operation executed on the resource using the instrumentation mechanism and detecting, via the processor, a script operation executed by the malicious script that results in resource data being sent to an external computing device from a client device. Furthermore, the techniques include receiving, via the processor, metadata indicating the execution of the read operation, the write operation, and the script operation.

7 Claims, 5 Drawing Sheets

(56) References Cited

U.S. PATENT DOCUMENTS

| | | | | |
|---|---|---|---|---|
| 9,231,975 B2* | 1/2016 | Johns | | H04L 63/20 |
| 9,338,185 B2* | 5/2016 | Evenden | | H04L 63/0823 |
| 2006/0143688 A1* | 6/2006 | Futoransky | | H04L 63/102 |
| | | | | 726/1 |
| 2007/0107057 A1* | 5/2007 | Chander | | G06F 21/54 |
| | | | | 726/22 |
| 2007/0256003 A1* | 11/2007 | Wagoner | | G06F 17/3089 |
| | | | | 715/205 |
| 2009/0100518 A1* | 4/2009 | Overcash | | G06F 21/552 |
| | | | | 726/22 |
| 2009/0249489 A1* | 10/2009 | Livshits | | G06F 21/54 |
| | | | | 726/26 |
| 2011/0252475 A1* | 10/2011 | Mui | | G06F 21/56 |
| | | | | 726/23 |
| 2011/0289599 A1* | 11/2011 | Evenden | | H04L 63/0823 |
| | | | | 726/29 |
| 2011/0307951 A1* | 12/2011 | Yermakov | | H04L 63/0227 |
| | | | | 726/12 |
| 2012/0090026 A1* | 4/2012 | Andrews | | G06F 17/3089 |
| | | | | 726/22 |
| 2012/0311713 A1 | 12/2012 | Amit et al. | | |
| 2013/0019301 A1* | 1/2013 | Reddy | | G06F 21/53 |
| | | | | 726/11 |
| 2013/0055400 A1* | 2/2013 | Lee | | H04L 63/1466 |
| | | | | 726/25 |
| 2013/0055402 A1 | 2/2013 | Amit et al. | | |
| 2013/0111584 A1* | 5/2013 | Coppock | | H04L 63/145 |
| | | | | 726/22 |
| 2013/0185623 A1* | 7/2013 | Wicker | | G06F 21/54 |
| | | | | 715/234 |
| 2013/0247204 A1* | 9/2013 | Schrecker | | H04L 45/306 |
| | | | | 726/25 |
| 2014/0373087 A1* | 12/2014 | Ciu | | H04L 63/145 |
| | | | | 726/1 |
| 2015/0007251 A1* | 1/2015 | Johns | | H04L 63/20 |
| | | | | 726/1 |
| 2015/0248559 A1* | 9/2015 | Madou | | H04L 63/1433 |
| | | | | 726/25 |
| 2015/0304337 A1* | 10/2015 | Nguyen-Tuong | | G06F 21/51 |
| | | | | 726/1 |

OTHER PUBLICATIONS

Galan, E. et al.; "A Multi-agent Scanner to Detect Stored-XSS Vulnerabilities"; ICITST-2010 Technical Co-Sponsored by IEEE UK/RI Communications Chapter; Copyright 2010; pp. 332-337.

Kedmi S. et al.; "Expedited Blind XSS Vulnerability Detection Technique"; Oct. 3, 2013; IBM Application Security Research Group.

"IBM Security AppScan Standard"; IBM Software Security; Dec. 2013.

List of IBM Patents or Patent Applications Treated as Related, signed Jun. 1, 2015, 2 pages.

Bau et al., "State of the Art: Automated Black-Box Web Application Vulnerability Testing," 2010 IEEE Sumposium on Security and Privacy (SP), May 2010, 14 pages. http://crypto.stanford.edu/~jcm/papers/pci_oakland10.pdf.

* cited by examiner

PERSISTENT CROSS-SITE SCRIPTING VULNERABILITY DETECTION

BACKGROUND OF THE INVENTION

The present invention relates to detecting a vulnerability, and more specifically, but not exclusively, to detecting a persistent cross-site scripting vulnerability.

SUMMARY

According to an embodiment described herein, a method for detecting a persistent cross-site scripting vulnerability includes detecting, via a processor, a read operation executed on a resource using an instrumentation mechanism. The method also includes returning, via the processor, a malicious script in response to the read operation and detecting, via the processor, a write operation executed on the resource using the instrumentation mechanism. Additionally, the method includes detecting, via the processor, a script operation that indicates the execution of the malicious script that results in resource data being sent to an external computing device from a client. Furthermore, the method includes receiving, via the processor, metadata indicating the execution of the read operation, execution of the write operation, and execution of the script operation.

According to another embodiment, a system for detecting a persistent cross-site scripting vulnerability can include a memory device comprising processor executable instructions and a processor to send input to an application with a scanner. The processor can also detect a read operation executed on a resource using an instrumentation mechanism and return a malicious script in response to the read operation. Additionally, the processor can detect a write operation executed on the resource using the instrumentation mechanism and detect a script operation that indicates the execution of the malicious script that results in resource data being sent to an external computing device. Furthermore, the processor can receive metadata indicating the execution of the read operation, the write operation, and the script operation, and send the metadata to a monitoring module.

According to another embodiment, a computer program product for detecting a persistent cross-site scripting vulnerability is described herein, the computer program product comprising a computer readable storage medium having program code embodied therewith, the program code executable by a processing circuit to perform a method comprising sending, via the processing circuit, input to an application with a scanner. The program code executable by the processing circuit can also perform a method comprising detecting, via the processing circuit, a read operation executed by the application on a resource, returning, via the processing circuit, a malicious script in response to the read operation, and detecting, via the processing circuit, a write operation executed by the application on the resource. Additionally, the program code executable by the processing circuit can also perform a method comprising detecting, via the processing circuit, a script operation that indicates the execution of the malicious script that results in resource data being sent to an external computing device, receiving, via the processing circuit, metadata indicating the execution of the read operation, the write operation, and the script operation, and sending, via the processing circuit, the metadata to a monitoring module.

DETAILED DESCRIPTION

According to embodiments of the present disclosure, a computing device can detect a persistent cross-site scripting vulnerability. A persistent cross-site scripting vulnerability, as referred to herein, can include any flaw in any suitable application that enables the injection or insertion of a client-side script into data viewed by other users. For example, a persistent cross-site scripting vulnerability can exist in a web application that allows a client-side script to be inserted into a web page viewable by other users. In some examples, the client-side script can be inserted into a web application through any suitable text box, or other user interface, among others. A client-side script, as referred to herein, can include any suitable script in any suitable scripting language that can be executed on a client such as a web browser, or web application, among others.

In some examples, the client-side scripting vulnerability can be persistent or non-persistent. In persistent client-side scripting vulnerabilities, a client-side script can be displayed continuously through a website or web browser to any number of users when data is saved by a server. For example, a persistent client-side scripting vulnerability can include enabling users to post HTML formatted messages on a web page and allowing other users to view the HTML formatted messages. In a non-persistent client-side scripting vulnerability, a client-side script may be injected or inserted into a web client through search engines, among others. For example, the text of a search entered into a search engine may include control characters that enable a script to be injected into a web client or web browser.

In some examples, a client-side script may not be executed for an extended period of time. Accordingly, testing an application to determine if a persistent cross-site scripting vulnerability exists can take an unknown period of time to complete. The techniques described herein can minimize the period of time for testing a web client or application for a persistent cross-site scripting vulnerability and also determine resources that are susceptible to a persistent cross-site scripting vulnerability.

Figure 1:
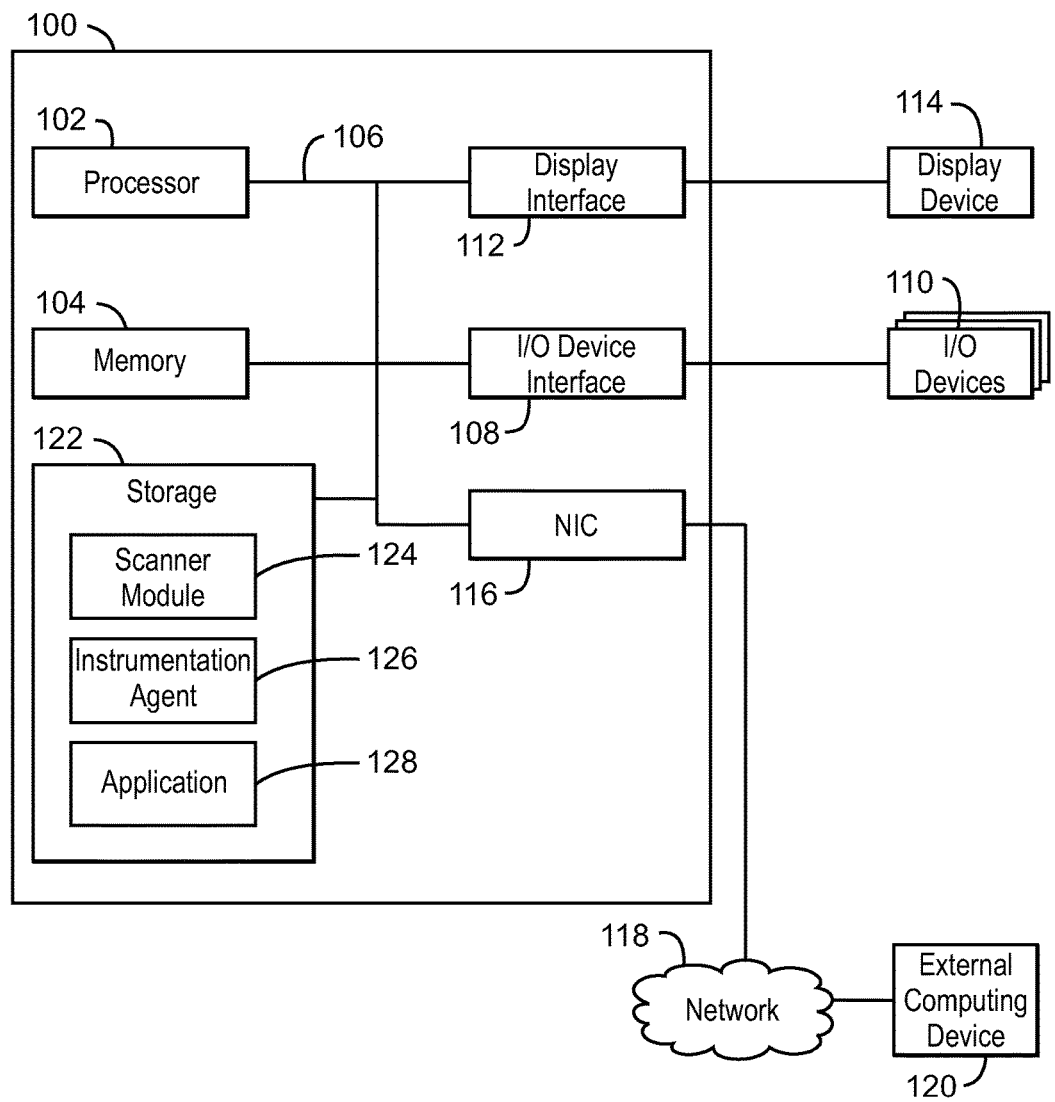
FIG. 1 is a block diagram of an example of a computing device that can detect a persistent cross-site scripting vulnerability.

FIG. 1 is an example of a computing device that can detect a persistent cross-site scripting vulnerability. The computing device 100 may be, for example, a desktop computer, laptop computer, tablet computer, or smartphone. The computing device 100 may include a processor 102 that is adapted to execute stored instructions, a memory device 104 that can store said instructions. The processor can be a single-core processor, multi-core processor, computing cluster, or any number of other configurations. The memory 104 can include random access memory (RAM), read only memory, flash memory, or any other suitable memory systems. The instructions executed by the processor 102 may be used to implement a method that can detect a persistent cross-site scripting vulnerability.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120, such as a client device, may connect to the computing device 100 through the network 118. The external computing device 120 is described in greater detail below.

The processor 102 may also be linked through the system interconnect 106 to a storage device 122 that can include a hard drive, an optical drive, a USB flash drive, an array of drives, or any combinations thereof. In some examples, the storage device 122 can include a scanner module 124, an instrumentation agent 126, and an application 128. In some embodiments, the scanner module 124 can generate any suitable input that is provided to an application 128. The input can include any number of alphanumeric characters, among other characters, that simulate user generated input. The scanner 124 can also include the capability of injecting client-side scripts in the input. In some embodiments, the scanner module 124 can send the generated input to the application 128.

In some examples, an application 128, as referred to herein, can include any suitable web application, an application that is executed by a web browser, or an application rendered by a web browser, among others. For example, an application 128 may include any suitable web browser that can detect input and display information in response to the input. In some examples, an application 128 may implement a search engine, or a web forum, among others.

In some embodiments, the instrumentation agent 126 can monitor function calls, such as read operations, and write operations, among others, executed by the application 128 on a resource to determine if a vulnerability exists within the application 128. A resource as referred to herein can include any data which an application can write to, read from, or include in operations. For example, a resource can include a database cell, a log entry, pictures, or text files, among others. A resource may be stored on the same computing device 100 as the application 128 or the resource may be stored on another computing device. In some embodiments, the instrumentation agent 126 can monitor function calls executed by the application 128 on a resource to detect if a read operation, a write operation, or a script operation is executed by the application 128. For example, the instrumentation agent 126 can monitor a resource accessible by the application 128 and determine if the application 128 executes a read operation on a resource, writes to the resource through a write operation, or if a malicious script returned to the application 128 is sent to additional applications or computing devices through a script operation. In some embodiments, the instrumentation agent 126 can detect a read operation from the application 128 on a resource and return a client-side script rather than returning data from the resource. The instrumentation agent 126 can also enumerate a resource by assigning an identifier to each accessed resource and include the enumerated resource identifier, along with call stack information, in a malicious client-side script.

In some embodiments, the instrumentation agent 126 can also detect metadata from the application 128 that indicates information such as whether a read operation, write operation, or script operation has been executed, or call stack data, among others. The call stack data can include state information for the application 128 such as pointer values, parameter values, and return addresses, and the like. The instrumentation agent 126 can send the metadata to any suitable application, hardware component, external computing device, or operating system, among others.

In some embodiments, the external computing device 120 can provide information to the computing device 100 to indicate that a script operation has been executed by the malicious script. For example, the malicious script may be executed on an external computing device 120, which results in the execution of the script operation that sends data about a resource to the instrumentation agent 126. In some examples, the malicious script sends data about a resource from an external computing device 120 to the instrumentation agent 126 through a separate computing device (also referred to herein as a validation server). The external computing device 120 may also send any suitable metadata or call stack data to the instrumentation agent 126, which can assist in determining the source of the vulnerability in the application 128. For example, the call stack data can include a sequence of function calls that result in read and write operations executed by the application 128 on a resource.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the scanner module 124, or the instrumentation agent 126, may be partially, or entirely, implemented in hardware and/or in the processor 102. For example, the functionality may be implemented with an application specific integrated circuit, or in logic implemented in the processor 102, among others.

Figure 2:
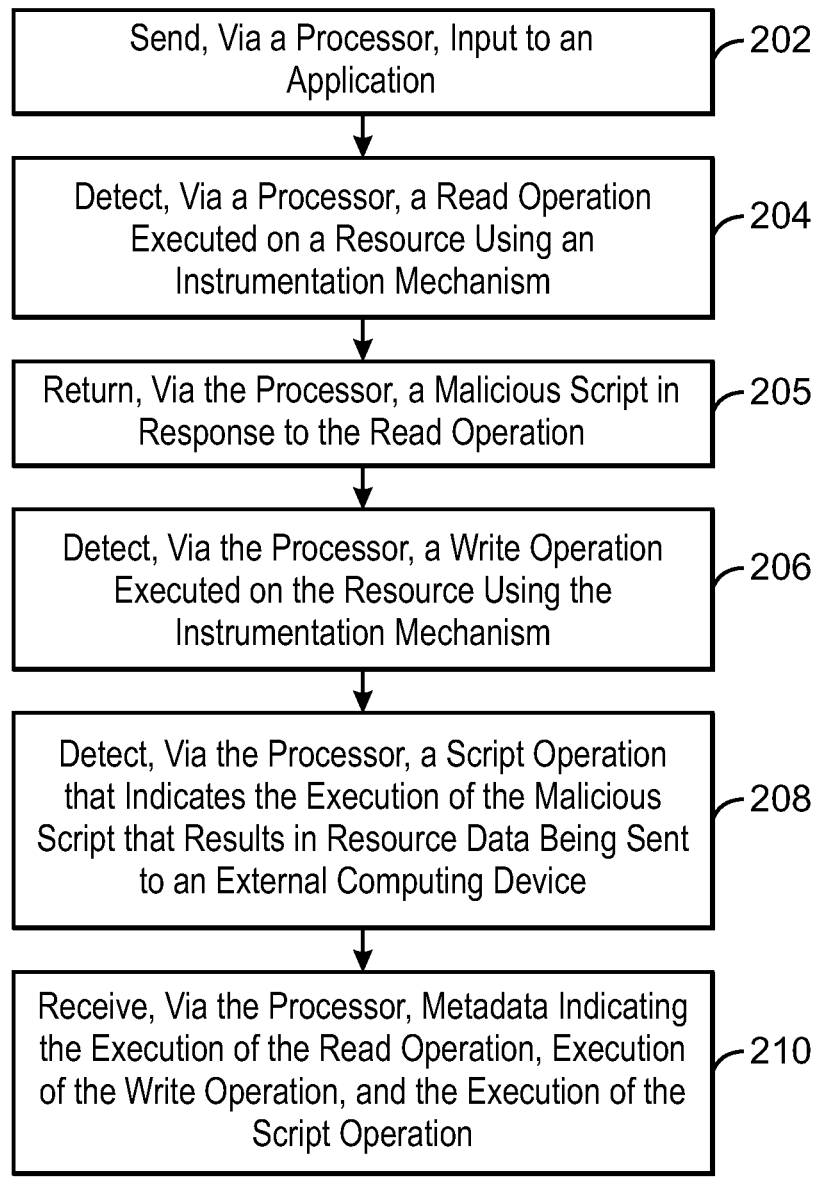
FIG. 2 is a process flow diagram of an example method that can detect a persistent cross-site scripting vulnerability.

FIG. 2 is an example of a method that can detect a persistent cross-site scripting vulnerability. The method 200 can be implemented with any suitable computing device, such as the computing device 100 of FIG. 1.

At block 202, the scanner module 124 can send, via a processor, input to an application. The input can include any suitable number of alphanumeric or control characters, among others, that can be entered in any suitable text box, or any additional user input section of an application. The application can include any suitable web application, an application that is executed by a web browser, or an application rendered by a web browser, among others. In some embodiments, the scanner module 124 can generate input based on simulated user interaction with an application. In some examples, the scanner module 124 can send input to an application that results in the application reading data from a resource or writing data to a resource.

At block 204, the instrumentation agent 126 can detect, via the processor, that a read operation is executed on a resource using an instrumentation mechanism. A resource can include any data which an application can write to, read from, or execute. For example, a resource can include a database cell, a log entry, pictures, or text files, among others. In some embodiments, the instrumentation agent 126 can detect that a read operation is executed on a resource using an instrumentation mechanism. An instrumentation mechanism, as referred to herein, enables the monitoring or hooking of function calls on a resource by an application. For example, an instrumentation mechanism may enable an instrumentation agent 126 to monitor or hook onto a read function on a resource and the instrumentation agent 126 can modify a read bit in metadata to indicate the execution of the read operation. Monitoring or hooking function calls enables the instrumentation agent 126 to detect when a function call attempts to access a resource. For example, the instrumentation agent 126 may detect when a resource is accessed by an application. In some embodiments, the instrumentation agent 126 can also monitor call stack data and return the call stack data as metadata when the resource is accessed.

At block 205, the instrumentation agent 126 can return, via a processor, a malicious script in response to the read operation. A malicious script, as referred to herein, can include any suitable script, programming code, or any suitable text, that can read data, modify data, or retrieve data without permission. In some examples, the instrumentation agent 126 returns a malicious script in response to a detected function call. For example, the instrumentation agent 126 may return a malicious script to determine if an application will remove or sanitize the malicious script from the returned data.

At block 206, the instrumentation agent 126 can detect, via the processor, that a write operation is executed on the resource using an instrumentation mechanism. For example, the instrumentation agent 126 may detect when an application executes a function call that results in writing or storing data to a resource. In some embodiments, the instrumentation agent 126 can detect if an application sanitizes input that includes malicious scripts. For example, an application can sanitize the malicious script included in input by removing any control characters or operations from the malicious script that may read to, write from, or otherwise access data stored in a resource. In some embodiments, the instrumentation agent 126 can modify a write bit in metadata if the write operation is executed without alteration. The write bit in the metadata can indicate that a resource is writable, that a write function call is issued by an application, and that unsanitized data is written to a resource by the application. Unsanitized data, as referred to herein, can include any data received as input by an application for which the application does not remove control characters before writing the input to a resource.

In some embodiments, the instrumentation agent 126 can detect and store call stack information and test information when a write operation is executed by an application. The call stack information can include any suitable data that indicates the state of the application at the time of the execution of the write operation. For example, the call stack information may include any suitable number of variables, variable values, and states of functions, among others. The test information can include any suitable data that indicates the resource that is altered by the write operation and a test signature associated with the application that executed a write operation. In some examples, the test signature can include any suitable string of alphanumeric characters.

At block 208, the instrumentation agent 126 can detect, via the processor, a script operation that indicates the execution of the malicious script that results in resource data being sent to an external computing device from a client. Resource data, as referred to herein, can include any suitable data related to a resource such as data from the resource, data indicating a location of the resource, an enumerated resource identifier, if a write function call was detected before a read function call, a test identifier that caused an application to write to a resource, a call stack of an application, or data indicating a property of the resource, among others. In some embodiments, a malicious script can be executed on a client device, which can result in the execution of a script operation that sends resource data to an external computing device. A script operation, as referred to herein, can include any suitable function call executed by a client-side script that sends data to another computing device. In some embodiments, the instrumentation agent 126 can detect when a script operation has been executed on a client device by detecting data from the client device. In some examples, an external computing device can send any suitable metadata to the instrumentation agent 126 indicating that a script operation has been executed by a malicious script and resource data has been sent to an external computing device. In some embodiments, the instrumentation agent 126 can modify a script bit in metadata in response to detecting that a script operation has been executed by a malicious script. For example, the instrumentation agent 126 may detect when an external computing device executes the malicious script because the execution of the malicious script may result in data about a resource being sent to the instrumentation agent 126. The instrumentation agent 126 may also receive data from a script operation from a validation server, or additional computing device, that receives data directly from a client device on which the malicious script is executed.

At block 210, the instrumentation agent 126 can receive, via the processor, metadata indicating the execution of the read operation, the write operation, and the script operation by the malicious script. As discussed above, the metadata can include a read bit, a write bit, and a script bit that indicate, respectively, if a read operation, write operation, or script operation has been executed. The metadata can also include the call stack data or test information at the time of execution of a read operation, write operation, or script operation. In some embodiments, the instrumentation agent 126 can generate and send a warning or indication to a monitoring module that an application has a client-side scripting vulnerability based on the metadata. For example, if metadata indicates that a read operation, write operation, and script operation have been executed, the instrumentation agent 126 can send the metadata to a monitoring module. In some examples, the monitoring module can be implemented by an operating system, an application, or code executed in a hardware device, among others. The monitoring module can analyze the metadata to determine information regarding the identified vulnerability such as time of execution, among others.

In some embodiments, the monitoring module can indicate resources that are susceptible to a blind persistent cross-site scripting vulnerability. A blind persistent cross-site scripting vulnerability can include a flaw in which an application stores a malicious script in a resource, but the creator of the malicious script cannot determine when or where the malicious script is executed. In some embodiments, a malicious script may use a blind cross-site validation server to identify the data received from execution of a malicious script. For example, a malicious script may send resource data, or any other suitable data, to a blind cross-site validation server, which indicates that the malicious script has been executed. The metadata from the instrumentation agent 126 can expedite the identification of a blind cross-site vulnerability by indicating that a malicious script has executed a read operation, a write operation, and a script operation, or any combination thereof. In some examples, the instrumentation agent 126 can perform any of the operations of the monitoring module.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. In some embodiments, the instrumentation agent 126 can detect a read operation once a write operation has been detected. For example, the instrumentation agent 126 may detect a write operation that alters the values stored in a resource. In response to detecting the write operation, the instrumentation agent 126 may monitor the resource to determine if a read operation accesses the resource. Additionally, the instrumentation agent 126 may also detect a read operation and send a malicious script to an application rather than the data requested from the read operation. In some embodiments, the instrumentation agent 126 can also enumerate a resource by assigning an identifier to the resource. In some examples, when the malicious client-side script is executed by a client device, the client-side script sends resource data such as the enumerated resource identifier, and call stack, among others to the instrumentation agent 126 through a validation server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
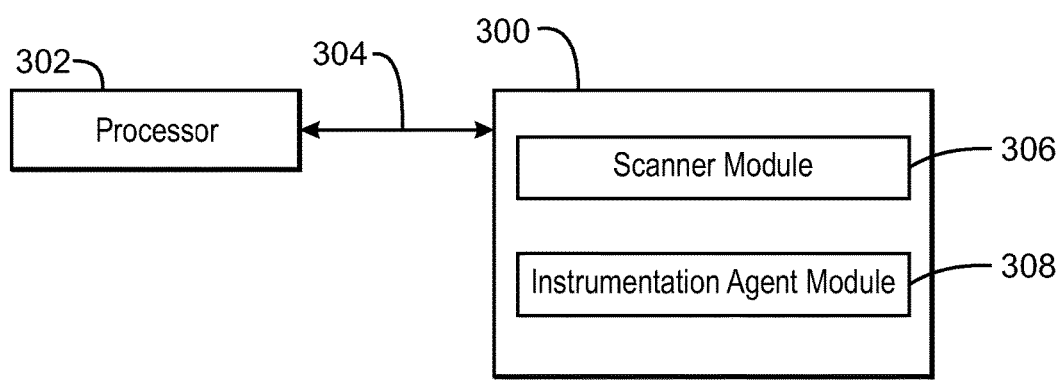
FIG. 3 is a tangible, computer-readable storage medium that can detect a persistent cross-site scripting vulnerability.

Referring now to FIG. 3, a block diagram is depicted of an example of a tangible, computer-readable storage medium that can detect a persistent cross-site scripting vulnerability. The computer-readable storage medium 300 may be accessed by a processor 302 over a computer interconnect 304. Furthermore, the computer-readable storage medium 300 may include code to direct the processor 302 to perform the operations of the current method.

The various software components discussed herein may be stored on the computer-readable storage medium 300, as indicated in FIG. 3. For example, a scanner module 306 may generate any suitable input that is provided to an application. The scanner 306 may, in some examples, include a client-side script in the input. In some embodiments, an instrumentation agent module 308 may monitor an application to determine if a vulnerability exists within the application. For example, the instrumentation agent module 308 may detect that an application executes a read operation, a write operation, or a script operation from a client-side script included in the input from the scanner 306. In some embodiments, the instrumentation agent module 308 can retrieve metadata indicating the vulnerability of the application. It is to be understood that any number of additional software components not shown in FIG. 3 may be included within the computer-readable storage medium 300, depending on the specific application.

Figure 4:
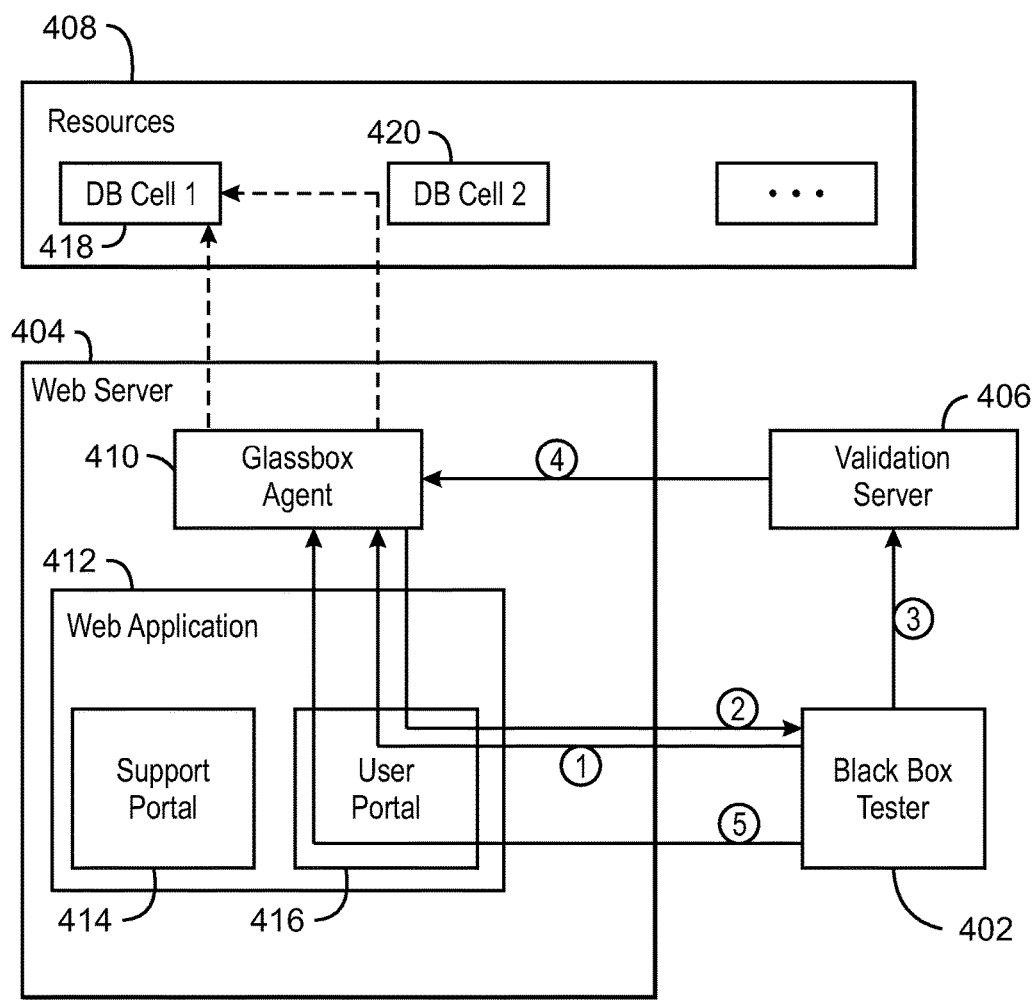
FIG. 4 is a block diagram of an example for detecting a persistent cross-site scripting vulnerability using techniques described herein.

FIG. 4 is a block diagram of an example technique for detecting a persistent cross-site scripting vulnerability. The persistent cross-site scripting vulnerability can be detected with a black box tester 402, a web server 404, a validation server 406, and resources 408. In some embodiments, the web server 404 can include a glassbox agent 410 and a web application 412, which can include a support portal 414 and a user portal 416. In some examples, the black box tester 402 can be implemented with the scanner module 124 of FIG. 1, the validation server 406 can be implemented with the external computing device 120 of FIG. 1, the web server 404 can be implemented with the computing device 100 of FIG. 1, the glassbox agent 410 can be implemented with the instrumentation agent 126 of FIG. 1, and the web application 412 can be implemented with the application 128 of FIG. 1. Additionally, in some examples, the black box tester 402 can be implemented by the web server 404. Furthermore, the resources 408 can include any suitable data from database cells 418 and 420, log entries, or text files, among others.

In some embodiments, the black box tester 402 can interact (indicated by the circled 1) with the web application 412 so that the web application 412 executes read operations on the resources 408. For example, the black box tester 402 can provide input to the web application 412 that simulates user input through a user portal 416, which requests data stored in resources 408. In some embodiments, the glassbox agent 410 can monitor or hook onto read function calls on the resources 408 by the web application 412 and the glassbox agent 410 can return (as indicated by the circled 2) a malicious client-side script rather than the data from the resources 408. In some examples, the glassbox agent 410 enumerates the resource and marks the resource as readable by storing a value as a read bit.

In some embodiments, the web application 412 returns the malicious client-side script to the black box tester 402 in place of the data from the resource 408. When executed, the script can cause an alert to be sent (indicated by the circled number 3) from the black box tester 402 to the validation server 406. The alert indicates that the web application 412 does not sanitize data returned from the resources 408 in response to a read operation. Accordingly, scripts stored in the resources 408 can be executed by clients who request the resources. In some embodiments, the validation server 406 can send (indicated by the circled number 4) the alert to the glassbox agent 410, which can store a value as a script bit that indicates the execution of a script by the black box tester 402.

Additionally, the black box tester 402 can send (indicated by the circled 5) input to the web application 412 that results in a write operation to the resources 408. For example, the black box tester 402 can send data and/or client-side scripts through a text box in the web application 412, wherein the data and/or client-side scripts are stored in the resources 408 by the web application 412. The glassbox agent 410 can monitor function calls on the resources 408 to detect that the web application 412 is attempting to store a client-side script in the resources 408 and the glassbox agent 410 can store a value as a write bit indicating that the web application 412 failed to sanitize a write operation. For example, a web application 412 can sanitize a write operation by preventing a client-side script received from the black box tester 402 from being stored in the resources 408.

It is to be understood that the block diagram of FIG. 4 is not intended to indicate that the web server 404 is to include all of the components shown in FIG. 4. Rather, the web server 404 can include fewer or additional components not illustrated in FIG. 4 (e.g., any number of black box testers 402, embedded controllers, additional modules, additional network interfaces, etc.). Furthermore, the operations illustrated in FIG. 4 can be executed in any particular order.

Figure 5:
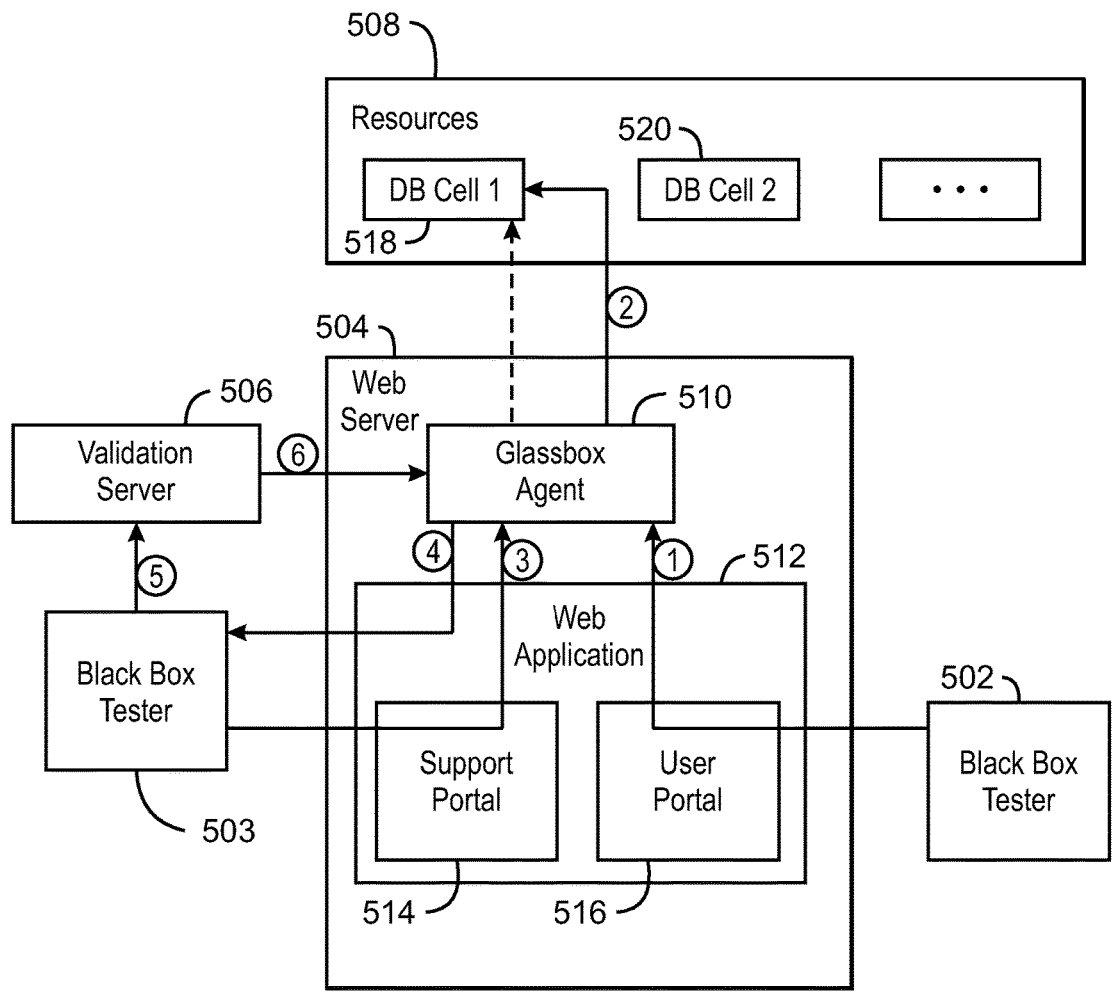
FIG. 5 is a block diagram of an example for detecting a persistent cross-site scripting vulnerability using techniques described herein.

FIG. 5 is a block diagram of an example technique for detecting a persistent cross-site scripting vulnerability. The persistent cross-site scripting vulnerability can be detected with black box testers 502 and 503, a web server 504, a validation server 506, and resources 508. In some embodiments, the web server 504 can include a glassbox agent 510 and a web application 512, which can include a support portal 514 and a user portal 516. The support portal 514 may be accessible by a support team, while the user portal 516 may be accessible by any user. In some examples, the black box tester 502 can be implemented with the scanner module 124 of FIG. 1, the validation server 506 can be implemented with the external computing device 120 of FIG. 1, the web server 504 can be implemented with the computing device 100 of FIG. 1, the glassbox agent 510 can be implemented with the instrumentation agent 126 of FIG. 1, and the web application 512 can be implemented with the application 128 of FIG. 1. Additionally, in some examples, the black box testers 502 and 503 can be implemented by the web server 504. Furthermore, the resources 508 can include any suitable data from database cells 518 and 520, log entries, or text files, among others.

In some embodiments, a black box tester 502 can send (indicated by the circled 1) input to the web application 504 that results in the web application 504 writing data to a database cell 518 or 520 in the resources 508. The glassbox agent 510 can monitor (indicated by the circled 2) the operations performed on the database cell 518 or 520, enumerate database cell 518 or 520, and store a value as a write bit when database cell 518 or 520 is written to. In some embodiments, the black box tester 503 can cause (indicated by the circled number 3) the web application 512 to read data from database cell 518 or 520. For example, the black box tester 503 can retrieve data sent by the black box tester 502 and stored in database cell 518 or 520. In some embodiments, a web application 512 can sanitize a write operation by preventing a client-side script received from the black box tester 502 from being stored or written to database cells 518 or 520. For example, the web application 512 can detect a client-side script in input received from the black box tester 502 and the web application 512 can output obfuscated data that cannot be executed as the client-side script.

In some embodiments, the glassbox agent 510 can monitor or hook onto read function calls on the database cells 518 or 520 by the web application 512 and the glassbox agent 510 can return (as indicated by the circled 4) a malicious client-side script to the black box tester 503 rather than the data from the database cells 518 or 520. In some examples, the glassbox agent 510 enumerates the resource and marks the resource as readable by storing a value as a read bit.

In some embodiments, the black box tester 503 executes the script returned by the glassbox agent 510 in place of the data from the resource 508. When executed, the script can cause an alert to be sent (indicated by the circled number 5) from the black box tester 503 to the validation server 506. The alert indicates that the web application 512 does not sanitize data returned from the resources 508. Accordingly, scripts stored in the resources 508 can be returned and executed by clients, such as black box tester 503. In some embodiments, the validation server 506 can send (indicated by the circled number 6) the alert to the glassbox agent 510, which can store a value as a script bit that indicates the execution of a script by the black box tester 503.

It is to be understood that the block diagram of FIG. 5 is not intended to indicate that the web server 504 is to include all of the components shown in FIG. 5. Rather, the web server 504 can include fewer or additional components not illustrated in FIG. 5 (e.g., additional black box testers 502 and 503, embedded controllers, additional modules, additional network interfaces, etc.). Furthermore, the operations illustrated in FIG. 5 can be executed in any particular order.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting a persistent cross-site scripting vulnerability comprising:
    a memory device comprising processor executable instructions; and
    a processor, the processor executable instructions including instructions to:
    insert a client-side script as input into a web application;
    request data from the web application;
    in response to the data request, detect that resource data from a client device is sent to an external computing device in response to execution of the client-side script on the client device, wherein the external computing device is a different device than the client device;
    receive at the external computing device, the inserted client-side script in response to requesting data from the web;
    receive from the external computing device, the inserted client-side script, in response to receiving the client-side script at the external computing device;
    detect that the client-side script is subsequently returned unaltered via the data request by comparing the inserted client-side script with the received client-side script, and that execution of the client-side script occurs.

2. The system of claim 1, wherein the inserted input simulates user interaction with the web applications.

3. The system of claim 1, wherein the processor executable instructions further include instructions to, responsive to detecting that execution of the client-side script occurred, create an indicator of a cross-site scripting vulnerability in the web applications, the indicator including metadata comprising at least one of: call stack data, a test identifier, a read bit, a write bit, and a script bit.

4. A computer program product for detecting a persistent cross-site scripting vulnerability, the computer program product comprising:
    one or more non-transitory computer readable storage media;
    program instructions stored on the one or more non-transitory computer readable storage media, executable by a processing circuit, the program instructions comprising:
    program instructions to insert a client-side script as input into a web application;
    program instructions to request data from the web application; and
    in response to the data request, program instructions to detect that resource data from a client device is sent to an external computing device in response to execution of the client-side script on the client device, wherein the external computing device is a different device than the client device;
    program instructions to receive at the external computing device, the inserted client-side script in response to requesting data from the web;
    program instructions to receive from the external computing device, the inserted client-side script, in response to receiving the client-side script at the external computing device;

program instructions to detect that the inserted client-side script is subsequently returned unaltered via the data request by comparing the inserted client-side script with the received client-side script, and that execution of the client-side script occurs.

5. The computer program product of claim 4, wherein the program instructions further comprise:
program instructions to monitor function calls to one or more resources to detect a write operation attempting to store the inputted client-side script on a resource without.

6. The computer program product of claim 4, wherein the program instructions further comprise program instructions to detect whether resource data from a client device is sent to an external computing device in response to execution of the client-side script on the client device.

7. The computer program product of claim 4, wherein the inserted input simulates user interaction with the web application.

* * * * *